United States Patent
Kojima et al.

(10) Patent No.: US 12,051,995 B2
(45) Date of Patent: *Jul. 30, 2024

(54) SOLAR POWER GENERATION NETWORK SHUT-OFF UNIT AND A SOLAR POWER GENERATION NETWORK SHUT-OFF SYSTEM PROVIDED WITH SAME

(71) Applicant: OMRON CORPORATION, Kyoto (JP)

(72) Inventors: Hideaki Kojima, Kyoto (JP); Ryo Ogura, Kyoto (JP); Mitsunori Sugiura, Kyoto (JP)

(73) Assignee: OMRON Corporation, Kyoto (JP)

( * ) Notice: Subject to any disclaimer, the term of this patent is extended or adjusted under 35 U.S.C. 154(b) by 188 days.

This patent is subject to a terminal disclaimer.

(21) Appl. No.: 17/627,911

(22) PCT Filed: Feb. 17, 2020

(86) PCT No.: PCT/JP2020/006024
§ 371 (c)(1),
(2) Date: Jan. 18, 2022

(87) PCT Pub. No.: WO2021/038914
PCT Pub. Date: Mar. 4, 2021

(65) Prior Publication Data
US 2022/0255502 A1    Aug. 11, 2022

(30) Foreign Application Priority Data
Aug. 27, 2019   (JP) ................................ 2019-154449

(51) Int. Cl.
*H02J 3/38*    (2006.01)
*H02J 3/00*    (2006.01)
(Continued)

(52) U.S. Cl.
CPC .............. *H02S 40/36* (2014.12); *H02J 3/001* (2020.01); *H02J 3/381* (2013.01); *H02S 40/32* (2014.12); *H02J 2300/24* (2020.01)

(58) Field of Classification Search
CPC .. H02H 3/00; H02H 7/26; H02H 7/268; H02J 3/001; H02J 3/381; H02J 2300/24;
(Continued)

(56) References Cited

U.S. PATENT DOCUMENTS

2001/0023703 A1   9/2001   Kondo et al.
2003/0236587 A1   12/2003  Ono
(Continued)

FOREIGN PATENT DOCUMENTS

JP    2001-320827 A    11/2001
JP    2006-216660 A    8/2006
(Continued)

OTHER PUBLICATIONS

An English translation of the International Search Report of PCT/JP2020/006024 mailed on Mar. 31, 2020.
(Continued)

*Primary Examiner* — Levi Gannon
(74) *Attorney, Agent, or Firm* — METROLEX IP LAW GROUP, PLLC; Robert L. Scott, Esq.

(57) ABSTRACT

A solar power generation network shut-off unit comprises a first circuit breaker and second circuit breakers. The first circuit breaker is provided to a power line connecting a plurality of solar power generation modules and a power conditioner in series. When an emergency shut-off button is pressed, the supply of power from the solar power generation modules through the power line is shut-off, and an emergency shut-off signal is transmitted. The second circuit breakers are provided to each of a plurality of solar power generation modules, and when an emergency shut-off signal
(Continued)

is received from the first circuit breaker, the supply of power from the plurality of solar power generation modules through the power line is shut-off.

14 Claims, 9 Drawing Sheets

(51) Int. Cl.
*H02S 40/32* (2014.01)
*H02S 40/36* (2014.01)

(58) Field of Classification Search
CPC ...... H02J 2300/26; H02S 40/32; H02S 40/36; H02S 50/00; H02S 50/10; Y04S 10/18; Y04S 10/20
See application file for complete search history.

(56) References Cited

U.S. PATENT DOCUMENTS

| | | | | |
|---|---|---|---|---|
| 2009/0121549 | A1* | 5/2009 | Leonard | H02M 3/156 307/51 |
| 2010/0030345 | A1 | 2/2010 | Cole et al. | |
| 2011/0115301 | A1* | 5/2011 | Bhavaraju | H02J 3/38 307/86 |
| 2011/0172842 | A1* | 7/2011 | Makhota | G05B 9/02 700/286 |
| 2012/0048326 | A1* | 3/2012 | Matsuo | H02S 50/10 702/65 |
| 2012/0050924 | A1* | 3/2012 | Matsuo | H02S 40/34 361/42 |
| 2013/0320767 | A1 | 12/2013 | Huang et al. | |
| 2016/0372929 | A1 | 12/2016 | Ishikawa | |
| 2017/0207620 | A1* | 7/2017 | Zhu | H02S 40/34 |
| 2017/0288384 | A1* | 10/2017 | Loewenstern | H01L 31/02021 |
| 2017/0373610 | A1* | 12/2017 | White | H02M 7/53871 |
| 2018/0013292 | A1 | 1/2018 | White et al. | |
| 2018/0287484 | A1* | 10/2018 | Braginsky | H02J 3/466 |
| 2018/0351354 | A1* | 12/2018 | Galin | H02M 7/42 |
| 2019/0027617 | A1* | 1/2019 | Varlan | H02S 50/10 |

FOREIGN PATENT DOCUMENTS

| | | |
|---|---|---|
| JP | 2013-247787 A | 12/2013 |
| JP | 2013-252046 A | 12/2013 |
| JP | 2014-33587 A | 2/2014 |
| JP | 2016-135016 A | 7/2016 |
| JP | 2016-208635 A | 12/2016 |
| JP | 2017-184355 A | 10/2017 |
| JP | 2018-509868 A | 4/2018 |
| JP | 2019-103209 A | 6/2019 |
| WO | 2015/087638 A1 | 6/2015 |
| WO | 2019168043 A1 | 9/2019 |
| WO | 2020171229 A1 | 8/2020 |
| WO | 2021/038915 A1 | 3/2021 |
| WO | 2021/038916 A1 | 3/2021 |

OTHER PUBLICATIONS

An English translation of the Written Opinion of PCT/JP2020/006024 mailed on Mar. 31, 2020.
An English translation of the International Search Report of a related international application PCT/JP2020/006025 mailed on Apr. 28, 2020.
An English translation of the Written Opinion of a related international application PCT/JP2020/006025 mailed on Apr. 28, 2020.
An English translation of the International Search Report of a related international application PCT/JP2020/006253 mailed on Mar. 31, 2020.
An English translation of the Written Opinion of a related international application PCT/JP2020/006253 mailed on Mar. 31, 2020.
The Office Action issued in a related U.S. Appl. No. 17/629,037 issued on Mar. 4, 2024.

* cited by examiner

SOLAR POWER GENERATION NETWORK SHUT-OFF UNIT AND A SOLAR POWER GENERATION NETWORK SHUT-OFF SYSTEM PROVIDED WITH SAME

TECHNICAL FIELD

The present invention relates to a solar power generation network shut-off unit that shuts off the supply of power between solar power generation modules and a power conditioner, and to a solar power generation network shut-off system provided with the unit.

BACKGROUND ART

Recent years have seen the use of a solar power generation system in which DC voltage is generated by photoelectric conversion in a solar power generation module, and the DC voltage generated in the solar power generation modules is converted into AC voltage by an inverter of a power conditioner, and then outputted.

With a solar power generation system such as this, as shown in Patent Literature 1 and 2, for example, a circuit breaker is provided to shut-off the supply of power from the solar power generation modules during the installation, repair, or maintenance of the solar power generation modules, or in the event of an emergency such as a fire, in order to ensure the safety of workers, firefighters, etc.

CITATION LIST

Patent Literature

Patent Literature 1: JP-A 2019-103209
Patent Literature 2: JP-A 2013-252046

SUMMARY

However, the following problem was encountered with the above-mentioned conventional solar power generation network shut-off system.

With the solar power generation network shut-off systems disclosed in the above-mentioned publications, one circuit breaker (a relay, a control unit, etc.) is provided for each solar power generation module. Therefore, installing all these circuit breakers takes a long time, and the installation cost may increase.

It is an object of the present invention to provide a solar power generation network shut-off unit with which the construction cost can be kept low when installing circuit breakers that operate in an emergency or the like, as well as a solar power generation network shut-off system provided with the unit.

The solar power generation network shut-off unit according to the first invention is a solar power generation network shut-off unit that is disposed between a plurality of solar power generation modules and a power conditioner and that shuts off the supply of power from the solar power generation modules to the power conditioner when an emergency shut-off button is pressed, the unit comprising a first circuit breaker and second circuit breakers. The first circuit breaker is provided to a power line connecting the plurality of solar power generation modules and the power conditioner in series, and, when the emergency shut-off button is pressed, shuts off the supply of power through this power line from the solar power generation modules, and transmits an emergency shut-off signal. One second circuit breaker is provided for a plurality of solar power generation modules and, when the emergency shut-off signal is received from the first circuit breaker, shuts off the supply of power from the plurality of solar power generation modules through the power line.

Here, solar power generation shut-off unit that is disposed between a plurality of solar power generation modules and a power conditioner, and that shuts off the supply of power from the solar power generation modules to the power conditioner when an emergency shut-off button is pressed, comprises a first circuit breaker that shuts off the supply of power when the emergency shut-off button is pressed, and second circuit breakers that shut off the supply of power from the solar power generation modules after the shut-off at the first circuit breaker.

Here, for example, one first circuit breaker is disposed in the vicinity of the inverter included in the power conditioner, and shuts off the supply of power from the solar power generation modules to the power conditioner.

The second circuit breakers are, for example, disposed in the vicinity of the plurality of solar power generation modules, and are disposed upstream of the first circuit breaker along the power supply path from the solar power generation modules to the power conditioner, and receive an emergency shut-off signal from the first circuit breaker and shut-off the supply of power from the solar power generation modules.

The emergency shut-off button may be provided anywhere in a system in which this solar power generation network shut-off unit is installed and which includes a plurality of solar power generation modules and a power conditioner.

The transfer of emergency shut-off signals and shut-off completion signals between the first circuit breaker and the second circuit breakers may be accomplished by wired communication or by wireless communication such as Wifi (registered trademark).

Consequently, when the emergency shut-off button is pressed in an emergency such as fire, or during repair or maintenance, for example, first, the first circuit breaker shuts off the supply of power from the solar power generation modules to the power conditioner and transmits an emergency shut-off signal, and when the second circuit breakers receive the transmitted emergency shut-off signal, the supply of power from the solar power generation modules to the power conditioner can also be shut off on the second circuit breaker side.

As a result, when the emergency shut-off button is pressed, it is possible to prevent the high-voltage power supplied from the solar power generation modules from being applied, which ensures the safety of workers or the like. Also, by using a combination of second circuit breakers that are provided to each of a plurality of solar power generation modules and a first circuit breaker that controls the shut-off of the second circuit breakers, installation costs can be kept lower than with a conventional configuration in which one circuit breaker was provided to each individual solar power generation module.

The solar power generation network shut-off unit according to the second invention is the solar power generation network shut-off unit according to the first invention, wherein the first circuit breaker has a first emergency shut-off determination unit that detects that the emergency shut-off button has been pressed; a first shut-off unit that shuts off the supply of power from the solar power generation modules through the power line; a first shut-off control unit that controls the first shut-off unit so as to shut-off the supply of power when the first emergency shut-off determination unit determines that the emergency shut-off button has been pressed.

Here, the first emergency shut-off determination unit detects the operation of the emergency shut-off button, the first shut-off control unit controls the shut-off of the first circuit breaker unit depending on whether or not the emergency shut-off button has been pressed.

Consequently, the power supply shut-off operation in the first circuit breaker can be carried out according to the operation status of the emergency shut-off button.

The solar power generation network shut-off unit according to the third invention is the solar power generation network shut-off unit according to the second invention, wherein the first circuit breaker further has a display signal output unit that transmits to the power conditioner a display signal for controlling a display unit provided to the power conditioner so as to display that emergency shut-off is in progress when the first emergency shut-off determination unit determines that the emergency shut-off button has been pressed.

Here, when it is determined that the emergency shut-off button has been pressed, a message indicating that emergency shut-off is in progress, etc., is displayed on the display unit of the power conditioner.

Consequently, during repair or maintenance, or in the event of an emergency such as a fire, for example, a worker, firefighter, etc., can perform the work, etc., after first checking the message displayed on the display unit of the power conditioner, and this prevents the application of the high-voltage power supplied from the solar power generation modules to the worker, etc., and therefore improves safety.

The solar power generation network shut-off unit according to the fourth invention is the solar power generation network shut-off unit according to any of the first to third inventions, wherein the second circuit breakers have a second communication unit that receives the emergency shut-off signal; a second emergency shut-off determination unit that determines whether or not the emergency shut-off signal has been received by the second communication unit; a second shut-off unit that shuts off the supply of power from the solar power generation modules through the power line; and a second shut-off control unit that controls the second shut-off unit so as to shut off the supply of power when the second emergency shut-off determination unit determines that the emergency shut-off signal has been received.

Here, on the second circuit breaker side, when the second emergency shut-off determination unit determines that an emergency shut-off signal has been received at the second communication unit, the second shut-off control unit controls the second circuit breakers so as to shut-off the supply of power.

Consequently, when the emergency shut-off button is pressed and an emergency shut-off signal is received from the first circuit breaker side, the supply of power from the solar power generation modules can be shut off on the second circuit breaker side.

The solar power generation network shut-off unit according to the fifth invention is the solar power generation network shut-off unit according to any of the first to fourth inventions, wherein the second circuit breakers control the second shut-off unit so that the second shut-off control unit shuts off the supply of power after confirming the shut-off state at the first circuit breaker.

Here, the shut-off operation is performed at the second circuit breakers after the shut-off operation at the first circuit breaker.

Consequently, when the emergency shut-off button is pressed, first of all, the first circuit breaker installed on the power conditioner side performs a shut-off operation, after which the second circuit breakers installed on the solar power generation module side perform a shut-off operation, which lowers the voltage applied to the terminal portion when the second circuit breakers are put in an open state, for example.

As a result, the withstand voltage of the second circuit breakers provided to each of the plurality of solar power generation modules can be set low, and this greatly lowers the cost as compared to a configuration in which a circuit breaker with high withstand voltage is provided to each individual solar power generation module.

The solar power generation network shut-off unit according to the sixth invention is the solar power generation network shut-off unit according to the fourth or fifth invention, wherein the second circuit breakers each further have a power supply holding unit for storing the electric power supplied from the solar power generation modules.

Here, the second circuit breakers are each provided with a power holding unit such as a capacitor that can store that power that is supplied from the solar power generation modules and is used to operate the second circuit breakers.

Consequently, the power supplied from the solar power generation modules can be temporarily stored for operating the second circuit breakers without having to provide a power supply on the second circuit breaker side.

The solar power generation network shut-off unit according to the seventh invention is the solar power generation network shut-off unit according to any of the first to sixth inventions, wherein the first circuit breaker and the second circuit breakers transmit and receive the emergency shut-off signal through wired communication.

Here, the transmission and reception of emergency shut-off signals between the first circuit breaker and the second circuit breakers are performed through wired communication such as PLC (power line communication), for example.

This allows emergency shut-off signals to be reliably transmitted and received between the first circuit breaker and the second circuit breakers.

The solar power generation network shut-off unit according to the eighth invention is the solar power generation network shut-off unit according to the second or third inventions, wherein the first circuit breaker further has a first communication unit that transmits a communication signal to the second circuit breakers, and a first communication control unit that controls the first communication unit so as to continuously transmit the communication signal.

Here, in addition to the shut-off operation at the first circuit breaker and the second circuit breakers using the above-mentioned emergency shut-off signal, on the first circuit breaker side, the first communication control unit controls the first communication unit so as to continuously transmit a communication signal to the second circuit breakers.

Consequently, on the first circuit breaker side, a communication signal for detecting whether or not there is any disconnection can be continuously transmitted.

The solar power generation network shut-off unit according to the ninth invention is the solar power generation network shut-off unit according to the eighth invention, wherein the second circuit breakers have a second communication unit that receives the communication signal continuously transmitted from the first communication unit; a signal determination unit that detects that the reception of the communication signal received by the second communication unit has been interrupted; and a disconnection determination unit that determines that there is a disconnection in the power line if a specific length of time has elapsed since it was detected by the signal determination unit that the reception of the communication signal was interrupted.

Here, a communication signal that is continuously transmitted from the first circuit breaker to the second circuit breakers is used to detect that a disconnection has occurred in a part of the power line where the first circuit breaker and the second circuit breakers are installed.

Consequently, it can be determined that there is a disconnection after a specific length of time has elapsed since the reception of the communication signal continuously transmitted from the first circuit breaker to the second circuit breakers was interrupted at the second circuit breakers.

The solar power generation network shut-off unit according to the tenth invention is disposed between a plurality of solar power generation modules and a power conditioner, and shuts off the supply of power from the solar power generation modules to the power conditioner, the solar power generation network shut-off unit comprising a first circuit breaker and second circuit breakers. The first circuit breaker is provided to a power line connecting the plurality of solar power generation modules and the power conditioner in series, shuts off the supply of power through this power line from the solar power generation modules, and continuously transmits a communication signal. One second circuit breaker is provided for a plurality of solar power generation modules, receives the communication signal continuously transmitted from the first circuit breaker, and, when a specific length of time has elapsed since the interruption of the reception of the communication signal, shuts off the supply of power from the plurality of solar power generation modules through the power line.

Here, in a solar power generation network breaker unit that is disposed between a plurality of solar power generation modules and a power conditioner and that shuts off the supply of power from the plurality of solar power generation modules to the power conditioner, and once a specific length of time has elapsed since the interruption at the second circuit breakers of the reception of the communication signal continuously transmitted from the first circuit breaker, it is determined that there is a disconnection, and the second circuit breakers shut-off the supply of power from the solar power generation modules.

Here, for example, one first circuit breaker is disposed in the vicinity of an inverter included in the power conditioner, and shuts off the supply of power from the solar power generation modules to the power conditioner.

Also, the second circuit breakers are disposed, for example, in the vicinity of the plurality of solar power generation modules and on the upstream side of the first circuit breaker along the power supply path from the solar power generation modules to the power conditioner. The second circuit breakers then shut-off the supply of power from the solar power generation modules once a specific length of time has elapsed since the reception of the communication signal continuously transmitted from the first circuit breaker was interrupted.

The exchange of communication signals between the first circuit breaker and the second circuit breakers may be accomplished by wired communication or wireless communication such as Wifi (registered trademark).

Consequently, if a part of the power line constituting the system is disconnected in the event of a fire or the like, it is detected that the reception of the communication signal continuously transmitted from the first circuit breaker is interrupted at the second circuit breakers, and once a specific length of time has elapsed since this detection, the supply of power from the solar power generation modules to the power conditioner can be shut-off at the second circuit breakers.

As a result, it is possible to prevent the application of high-voltage power supplied from the solar power generation modules in the event of a fire or the like, and thereby ensure the safety of firefighters, etc. Also, by using a combination of second circuit breakers that are provided to each of a plurality of solar power generation modules and a first circuit breaker that controls the shut-off of the second circuit breakers, installation costs can be kept lower than with a conventional configuration in which one circuit breaker was provided to each individual solar power generation module.

The solar power generation network shut-off unit according to the eleventh invention is the solar power generation network shut-off unit according to the tenth invention, wherein the first circuit breaker has a first communication unit that transmits the communication signal and receives the shut-off completion signal and a response signal to the communication signal transmitted to the second circuit breakers; a first communication control unit that controls the first communication unit so as to continuously transmit the communication signal.

Here, on the first circuit breaker side, the first communication control unit controls the first communication unit so as to continuously transmit the communication signal to the second circuit breaker.

Consequently, the first circuit breaker can continuously transmit the communication signal for detecting whether or not there is any disconnection at the second circuit breaker.

The solar power generation network shut-off unit according to the twelfth invention is the solar power generation network shut-off unit according to the eleventh invention, wherein the second circuit breakers have a second communication unit that receives the communication signal continuously transmitted from the first communication unit and transmits the shut-off completion signal; a signal determination unit that detects that the reception of the communication signal received by the second communication unit has been interrupted; a disconnection determination unit that determines that there is a disconnection in the power line if a specific length of time has elapsed since the signal determination unit detected that the reception of the communication signal has been interrupted; a second shut-off unit that shuts off the supply of power from the solar power generation modules through the power line; a second shut-off control unit that controls the second shut-off unit so as to shut-off the supply of power when the disconnection determination unit has determined that there is a disconnection.

Here, a communication signal continuously transmitted from the first circuit breaker to the second circuit breaker is used.

Consequently, when a specific length of time has elapsed since the reception of the communication signal continuously transmitted from the first circuit breaker to the second circuit breakers was interrupted at the second circuit breakers, it is determined that there is a disconnection, and the supply of power can be shut off on the second circuit breaker side.

The solar power generation network shut-off unit according to the thirteenth invention is the solar power generation network shut-off unit according to the twelfth invention, wherein the second circuit breakers are such that the second shut-off control unit controls the second shut-off unit so as to shut-off the supply of power after the disconnection determination unit has determined that there is a disconnection in the power line and the system including the solar power generation modules is opened.

Here, the shut-off operation in the second circuit breaker is performed after it is determined that there is a disconnection in the first circuit breaker, and the system including the solar power generation modules changes from a closed state to an open state.

Consequently, when a disconnection in the power line is detected in the event of an emergency such as a fire, for example, the second circuit breakers provided on the solar power generation module side perform a shut-off operation after the disconnection is detected.

As a result, since the voltage applied to the terminal portion can be reduced when a plurality of second circuit breakers are opened, for example, second circuit breakers having a lower withstand voltage can be used.

The solar power generation network shut-off unit according to the fourteenth invention is the solar power generation network shut-off unit according to the twelfth or thirteenth invention, wherein the second circuit breakers further have a power supply holding unit for storing the electric power supplied from the solar power generation modules.

Here, the second circuit breakers are provided with a capacitor or another such power holding unit for storing the power that is supplied from the solar power generation modules and is used to operate the second circuit breakers.

Consequently, the power supplied from the solar power generation modules can be temporarily stored and the second circuit breakers can be operated without having to provide a power supply on the second circuit breaker side.

The solar power generation network shut-off unit according to the fifteenth invention is the solar power generation network shut-off unit according to any of the tenth to fourteenth inventions, wherein the first circuit breaker and the second circuit breakers transmit and receive communication signals through wired communication.

Here, communication signals are transmitted and received between the first circuit breaker and the second circuit breakers via wired communication.

Consequently, communication signals transmitted and received in order to detect disconnection can be reliably transmitted and received between the first circuit breaker and the second circuit breakers.

The solar power generation network shut-off system according to the sixteenth invention comprises the solar power generation network shut-off unit according to any of the first to fifteenth inventions; a plurality of solar power generation modules; a power conditioner; a power line; and an emergency shut-off button.

The effect of using a system configuration comprising the above-mentioned solar power generation network shut-off unit is that the safety of workers and the like can be ensured, and the installation cost when installing circuit breakers that operate in an emergency, etc., can be reduced.

Effects

With the solar power generation network shut-off unit according to the present invention, the installation cost can be reduced when installing circuit breakers that operate in an emergency, etc.

DESCRIPTION OF EMBODIMENTS

Figure 1:
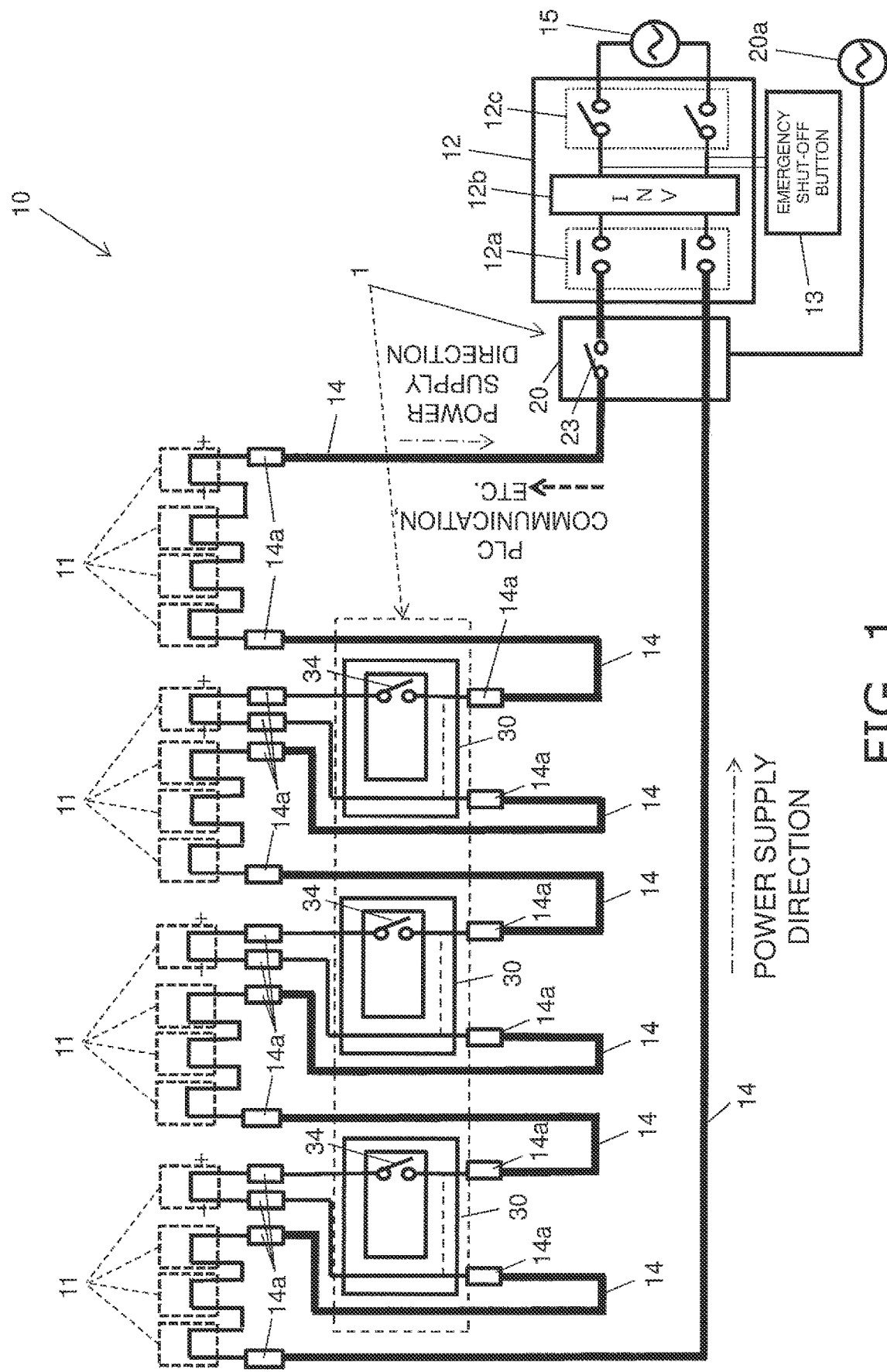
FIG. 1 is a system block diagram of the configuration of the solar power generation network shut-off system according to an embodiment of the present invention.

A solar power generation network shut-off system 10 including a solar power generation network shut-off unit 1 according to an embodiment of the present invention will now be described with reference to FIGS. 1 to 9.

In the following description, "upstream side" and "downstream side" refer to the upstream side and the downstream side in the power supply direction in which the power generated by photoelectric conversion in solar power generation modules 11 is supplied to a power conditioner 12.

(1) Configuration of Solar Power Generation Network Shut-Off System 10

The solar power generation network shut-off system 10 of this embodiment shuts off the supply of power from a plurality of the solar power generation modules 11 to the power conditioner 12 in an emergency, etc., for example, in a solar power generation network in which power generated by photoelectric conversion in the solar power generation modules 11 is supplied to a commercial power system 15 or a load device. More specifically, the solar power generation network shut-off system 10 is disposed between the solar power generation modules 11 and the power conditioner 12, and when the emergency shut-off button 13 is pressed, or when disconnection occurs in a part of the power line 14, the supply of power from the solar power generation modules 11 to the power conditioner 12 is shut-off.

With a solar power generation network in which the solar power generation network shut-off system 10 is installed, the electric power generated by photoelectric conversion in the solar power generation modules 11 is supplied to the conditioner 12 through the power line 14, which is connected via a plurality of connectors 14a. Then, as shown in FIG. 1, the power conditioner 12 converts DC power into AC power via a relay 12a, an inverter 12b, and a relay 12c, and this power is supplied to the commercial power system 15 or a load device.

Here, possible scenarios in which the emergency shut-off button 13 would be pressed by a person are, for example, a case in which installation, replacement, maintenance, or other such work is performed on the solar power generation modules 11, or a case in which there is an emergency such as a fire.

Also, a possible scenario in which disconnection would occur in a part of the power line 14 is a case in which there is deterioration of or an accident with the solar power generation network system, or there is an emergency such a fire, for example.

When the emergency shut-off button 13 is pressed or a disconnection occurs, high-voltage power supplied from the solar power generation modules 11 to the downstream side must be shut-off in order to ensure the safety of workers, firefighters, and the like.

Therefore, as shown in FIG. 1, the solar power generation network shut-off system 10 comprises the solar power generation network shut-off unit 1, the solar power generation modules 11, the power conditioner 12, the emergency shut-off button 13, and the power line 14.

The solar power generation network shut-off unit 1 comprises a single first circuit breaker 20 that functions as a master unit, and a plurality of second circuit breakers 30 that function as slave units.

As shown in FIG. 1, one first circuit breaker 20 is installed in the solar power generation network shut-off system 10, and is disposed on the power line 14, downstream from the plurality of solar power generation modules 11 and the plurality of second circuit breakers 30, and just upstream from the power conditioner 12.

Consequently, the first circuit breaker 20 can shut-off the supply of power before the power supplied from the solar power generation modules 11 is supplied to the power conditioner 12.

Also, as shown in FIG. 1, the first circuit breaker 20 is driven by power supplied from an AC power supply 20a. When the emergency shut-off button 13 is pressed, the first circuit breaker 20 shuts off the supply of power through the power line 14 by moving the shut-off unit 23 from its closed state to its open state.

The detailed configuration of the first circuit breaker 20 will be described in detail below.

As shown in FIG. 1, a plurality of second circuit breakers 30 are provided to each of a plurality of (four in this embodiment) solar power generation modules 11. The second circuit breakers 30 are disposed on the power line 14, just downstream from the solar power generation modules 11 and on the upstream side of the first circuit breaker 20.

Consequently, the second circuit breakers 30 can shut-off the power supplied from the solar power generation modules 11 on the upstream side of the first circuit breaker 20.

Also, as shown in FIG. 1, the second circuit breakers 30 are driven by being supplied with the power generated by photoelectric conversion in the solar power generation modules 11. The second circuit breakers 30 are controlled by various kinds of signal transmitted from the first circuit breaker 20. More specifically, the second circuit breakers 30 shut-off the supply of power through the power line 14 by moving the shut-off unit 34 from its closed state to its open state when an emergency shut-off signal is received from the first circuit breaker 20, or when a specific length of time has elapsed since the alive signal (communication signal) continuously transmitted from the first circuit breaker 20 was last received (that is, when disconnection is detected).

The detailed configuration of the second circuit breaker 30 will be described in detail below.

The solar power generation modules 11 include a typical solar power generation panel that generates DC power by photoelectric conversion from sunlight, and has a built-in bypass diode, for example.

The power conditioner 12 converts the DC power generated by the solar power generation modules 11 into AC power and outputs this DC power to the commercial power system 15, a load device, or the like. As shown in FIG. 1, the power conditioner 12 comprises a relay 12a, an inverter 12b, and a relay 12c. The DC power generated by the solar power generation modules 11 into AC power by the inverter 12b, and this AC power is outputted to the commercial power system 15 or the like.

Figure 2:
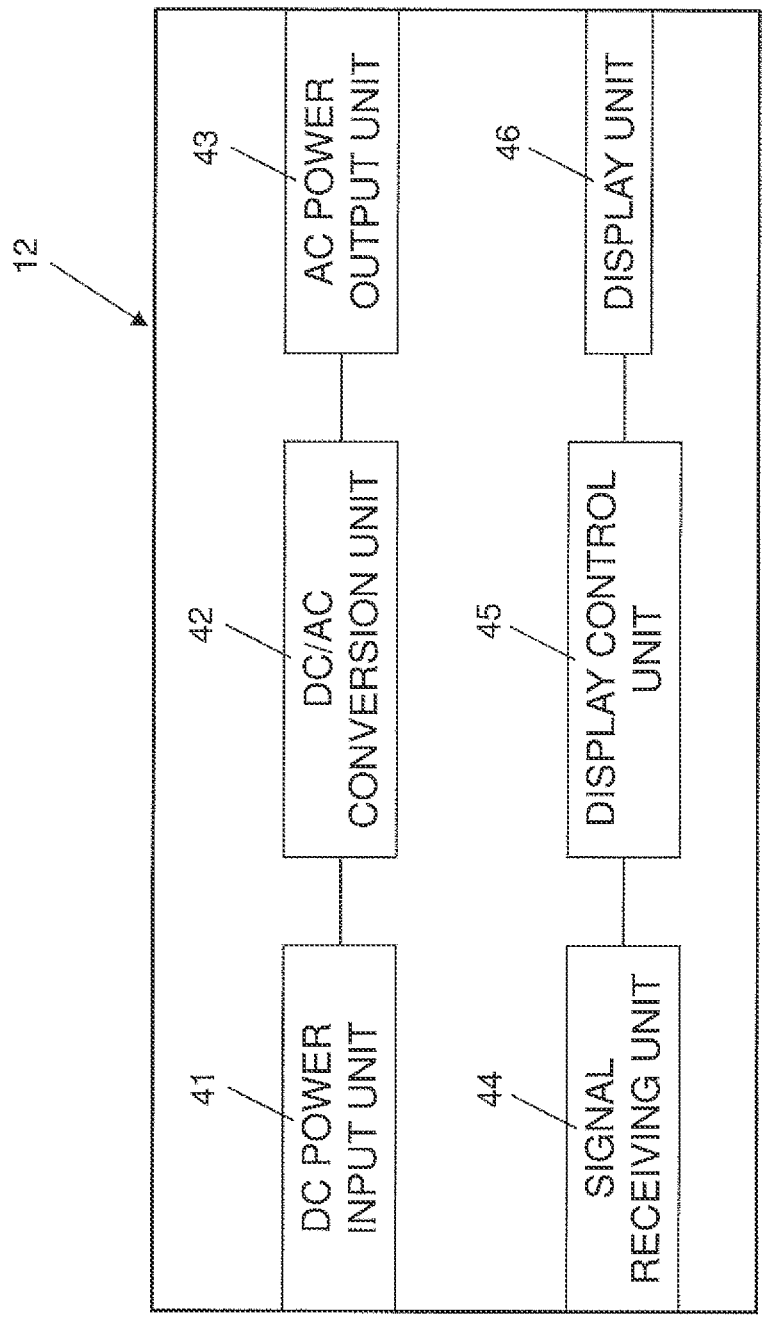
FIG. 2 is a block diagram of the configuration of the power conditioner included in the solar power generation network shut-off system in FIG. 1.

More specifically, as shown in FIG. 2, the power conditioner 12 comprises a DC power input unit 41, a DC/AC conversion unit 42, and an AC power output unit 43.

Consequently, the DC power supplied from the solar power generation modules 11 is inputted to the DC power input unit 41 and converted into AC power by the DC/AC conversion unit 42, and can then be outputted from the AC power output unit 43.

The power conditioner 12 further comprises a signal receiving unit 44 that receives a display control signal from the first circuit breaker 20 when emergency shut-off processing is executed by the first circuit breaker 20 (discussed below), a display control unit 45 that performs control so as to display a message indicating that emergency shut-off is in progress, etc., and a display unit 46 whose display is controlled by the display control unit 45.

The configuration of the power conditioner 12 is a typical configuration, and will therefore not be described in detail herein.

The emergency shut-off button 13 is disposed near the power conditioner 12, and is pressed by a worker performing repair or the like, a firefighter in the event of a fire, etc., to transmit an emergency shut-off button pressing signal to the first circuit breaker 20.

Consequently, the first circuit breaker 20 can execute emergency shut-off processing (discussed below) by receiving the emergency shut-off button pressing signal indicating that the emergency shut-off button 13 has been pressed.

The power line 14 serially connects the solar power generation modules 11 to each other, and also serially connects the solar power generation modules 11 and the power conditioner 12, and transmits the power supplied from the solar power generation modules 11 to the power conditioner 12. The power line 14 is also used as an electric wire for transmitting the alive signal and the emergency shut-off signal transmitted from the first circuit breaker 20 to the second circuit breakers 30 by using PLC (power line communication).

As shown in FIG. 1, the power line 14 directly connects the solar power generation modules 11 and the power conditioner 12, so when there is a disconnection in a part of the power line 14, for example, the supply of power is impossible, and the transmission and reception of an alive signal (discussed below) also becomes impossible.

(2) Solar Power Generation Network Shut-Off Unit 1

The solar power generation network shut-off unit 1 of this embodiment is disposed between the solar power generation modules 11 and the power conditioner 12, and is installed in order to shut-off the supply of power from the solar power generation modules 11 to the power conditioner 12 when the emergency shut-off button 13 is pressed, or when a disconnection is detected in a part of the power line 14.

More specifically, in the solar power generation network shut-off unit 1 of this embodiment, when the emergency shut-off button 13 is pressed, the shut-off unit 23 inside the first circuit breaker 20 enters its shut-off state, and an emergency shut-off signal is transmitted from the first circuit breaker 20 to the second circuit breakers 30, which puts the shut-off units 34 in the second circuit breakers 30 into a shut-off state.

Furthermore, in the solar power generation network shut-off unit 1 of this embodiment, the alive signal continuously transmitted from the first circuit breaker 20 is received at the second circuit breakers 30, and if a specific length of time has elapsed without the reception of the alive signal at the second circuit breakers 30, it is determined that a disconnection has occurred in a part of the power line 14, and the shut-off units 34 in the second circuit breaker 30 is put in a shut-off state.

As shown in FIG. 1, the solar power generation network shut-off unit 1 comprises the first circuit breaker 20 and the second circuit breakers 30.

(2-1) First Circuit Breaker 20

Figure 3:
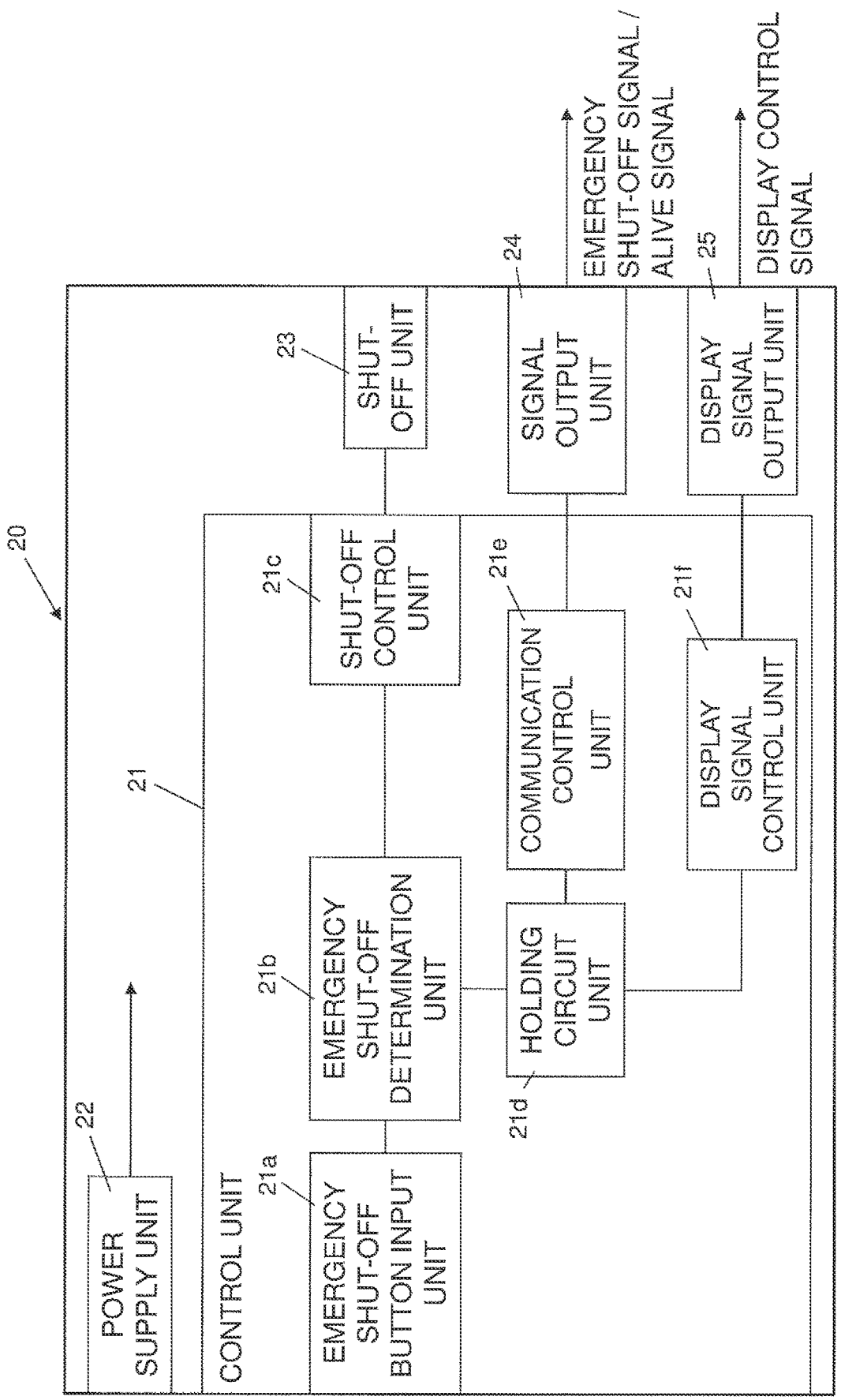
FIG. 3 is a block diagram of the configuration of a first circuit breaker constituting the solar power generation network shut-off unit included in the solar power generation network shut-off system in FIG. 1.

As shown in FIG. 1, the first circuit breaker 20 is disposed on the power line 14, just upstream from the power conditioner 12, and as shown in FIG. 3, has a control unit 21, a power supply unit 22, a shut-off unit (first shut-off unit) 23, a signal output unit (first communication unit) 24, and a display signal output unit 25.

The control unit 21 controls the components in the first circuit breaker 20, and as shown in FIG. 3, has an emergency shut-off button input unit 21a, an emergency shut-off determination unit (first emergency shut-off determination unit) 21b, a shut-off control unit (first shut-off control unit) 21c, a holding circuit unit 21d, a communication control unit (first communication control unit) 21e, a display signal control unit 21f.

The emergency shut-off button input unit 21a receives the emergency shut-off button pressing signal that is transmitted when the emergency shut-off button 13 is pressed, and transfers the received information to the downstream side.

The emergency shut-off determination unit (first emergency shut-off determination unit) 21b is connected to the emergency shut-off button input unit 21a, and determines whether or not an emergency shut-off button pressing signal has been inputted to the emergency shut-off button input unit 21a.

The shut-off control unit (first shut-off control unit) 21c is connected to the emergency shut-off determination unit 21b, and when the emergency shut-off determination unit 21b receives an emergency shut-off button pressing signal, moves the shut-off unit 23 from its closed state to its open state. This allows the shut-off control unit 21c to control the shut-off unit 23 so as to shut-off the supply of power through the power line 14.

The holding circuit unit 21d is connected to the emergency shut-off determination unit 21b, and when an emergency shut-off button pressing signal is received, the holding circuit unit 21d performs timer control of the emergency shut-off signal transmitted from the first circuit breaker 20 in order to put the second circuit breakers 30 into their shut-off state. That is, when the holding circuit unit 21d receives the emergency shut-off button pressing signal, a delay time is set for transmitting an emergency shut-off signal to the second circuit breakers 30 after a specific hold period has elapsed since the reception, and this delay time is sent to the communication control unit 21e.

The communication control unit (first communication control unit) 21e is connected to the holding circuit unit 21d, and when it is determined by the emergency shut-off determination unit 21b that the emergency shut-off button 13 has been pressed, the signal output unit 24 is controlled so as to transmit an emergency shut-off signal to the second circuit breakers 30 at the point when the delay time set in the holding circuit unit 21d has elapsed.

Also, the communication control unit 21e controls the time interval, transmission timing, and so forth of the alive signal used for disconnection detection, which is transmitted to the second circuit breakers 30 at specific time intervals.

The display signal control unit 21f is connected to the holding circuit unit 21d, and when it is determined by the emergency shut-off determination unit 21b that the emergency shut-off button 13 has been pressed, the display signal output unit 25 is controlled so as to output a display control signal to the signal receiving unit 44 of the power conditioner 12 at the point when the delay time set in the holding circuit unit 21d has elapsed.

As shown in FIG. 1, the power supply unit 22 is connected to the AC power supply 20a, performs AC/DC conversion or DC/DC conversion, and supplies power to the components constituting the first circuit breaker 20.

The shut-off unit (first shut-off unit) 23 is provided in the first circuit breaker 20 as a circuit breaker capable of shutting off the entire system voltage of the solar power generation network shut-off system 10. The shut-off unit 23 then switches the shut-off state at the first circuit breaker 20 by controlling the opening and closing according to the signal transmitted from the shut-off control unit 21c.

The signal output unit (first communication unit) 24 is connected to the communication control unit 21e, and an emergency shut-off signal is outputted to the second circuit breakers 30 at the point when the delay time set in the holding circuit unit 21d has elapsed, on the basis of a command from the communication control unit 21e.

Also, the signal output unit 24 transmits an alive signal to the second circuit breakers 30 at the transmission timing and the specific time intervals set by the holding circuit unit 21d and the communication control unit 21e.

The display signal output unit 25 is connected to the display signal control unit 21f, and outputs a display control signal and the like to the power conditioner 12 in response to a command from the display signal control unit 21f.

Consequently, the display unit 46 of the power conditioner 12 can display a message such as "emergency shut-off in progress" (see FIG. 7) after the second circuit breakers 30 are put into the shut-off state by an emergency shut-off signal transmitted from the first circuit breaker 20 to the second circuit breakers 30 at the point when a specific hold (delay) time has elapsed since the first circuit breaker 20 when into the shut-off state.

As a result, the second circuit breakers 30 can change to their shut-off state after a specific length of time has elapsed since the first circuit breaker 20 went into its shut-off state, so the voltage applied to the contact portion when the second circuit breakers 30 change to their shut-off state can be reduced as compared with the first circuit breaker 20. Consequently, the second circuit breakers 30 can have a withstand voltage lower than that of the first circuit breaker 20, so the cost of the solar power generation network shut-off unit 1 can be greatly reduced.

Also, compared to a configuration in which one circuit breaker is provided for each individual solar power generation module 11, a configuration is used in which one second circuit breaker 30 is provided for four of the solar power generation modules 11, so the installation cost can be reduced.

Furthermore, a message is displayed on the display unit 46 of the power conditioner 12 after the second circuit breakers 30 change to the shut-off state. Therefore, it is possible to prevent a message such as "emergency shut-off in progress" from being displayed in a state in which the second circuit breakers 30 have not yet changed to the shut-off state, and thereby ensure the safety of workers, firefighters, and so on.

(2-2) Second Circuit Breaker 30

Figure 4:
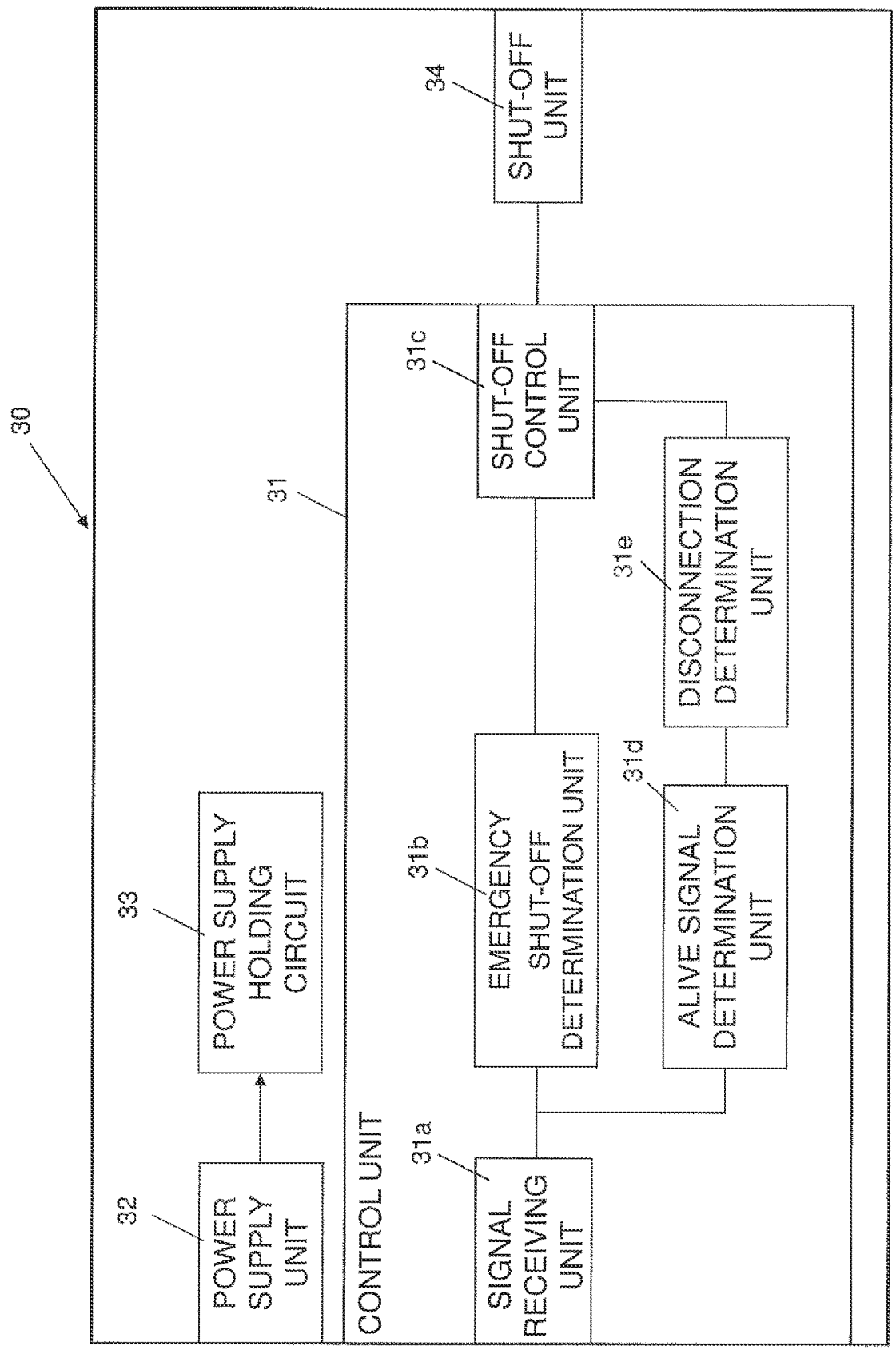
FIG. 4 is a block diagram showing the configuration of a second circuit breaker constituting the solar power generation network shut-off unit included in the solar power generation network shut-off system in FIG. 1.

As shown in FIG. 1, the second circuit breakers 30 are disposed on the power line 14, just downstream from the solar power generation modules 11, one for every four solar power generation modules 11. As shown in FIG. 4, the second circuit breakers 30 each have a control unit 31, a power supply unit 32, a power supply holding circuit (power supply holding unit) 33, and a shut-off unit (second shut-off unit) 34.

The control unit 31 has a signal receiving unit (second communication unit) 31a, an emergency shut-off determination unit (second emergency shut-off determination unit) 31b, a shut-off control unit (second shut-off control unit) 31c, an alive signal determination unit (signal determination unit) 31d, and a disconnection determination unit 31e.

The signal receiving unit (second communication unit) 31a receives the emergency shut-off signal and the alive signal outputted from the signal output unit 24 of the first circuit breaker 20, and transfers these to the downstream side.

The emergency shut-off determination unit (second emergency shut-off determination unit) 31b is connected to the signal receiving unit 31a, and determines whether or not an emergency shut-off signal has been received from the first circuit breaker 20.

The shut-off control unit (second shut-off control unit) 31c is connected to the emergency shut-off determination unit 31b and the disconnection determination unit 31e, receives the determination results from the determination units 31b and 31e, and controls the shut-off unit 34 so as to switch between a shut-off state or not a shut-off state.

The alive signal determination unit (signal determination unit) 31d is connected to the signal receiving unit 31a, and determines the reception status of the alive signal that is continuously received from the first circuit breaker 20 at specific time intervals. More specifically, the alive signal determination unit 31d determines whether or not the reception of the alive signal, which should be continuously received from the first circuit breaker 20 at specific time intervals, has been interrupted.

The disconnection determination unit 31e is connected to the alive signal determination unit 31d, receives the determination result from the alive signal determination unit 31d, and determines whether or not a disconnection has occurred in a part of the power line 14. More specifically, the disconnection determination unit 31e determines that a disconnection has occurred when there is still no reception even after the elapse of a specific length of time since the interruption of the reception of the alive signal that should be continuously received from the first circuit breaker 20 at specific time intervals.

The power supply unit 32 subjects the DC power supplied from the solar power generation modules 11 to DC/DC conversion, and supplies power to the components constituting the second circuit breakers 30.

The power supply holding circuit (power holding holding unit) 33 is, for example, a capacitor, which stores the DC power that is supplied from the solar power generation modules 11 and has undergone DC/DC conversion as energy for driving the second circuit breakers 30 for a set period of time.

The shut-off unit (second shut-off unit) 34 is provided to the second circuit breakers 30 as a circuit breaker capable of shutting off the supply of power from the solar power generation modules 11 included in the solar power generation network shut-off system 10 to the downstream side. The shut-off units 34 then switch the shut-off state in the second circuit breakers 30 by controlling the opening and closing according to the signal transmitted from the shut-off control unit 31c.

Emergency Shut-Off Control by Solar Power Generation Network Shut-Off Unit 1

With the solar power generation network shut-off unit 1 of this embodiment, because of the above configuration, when the emergency shut-off button 13 is pressed, the first circuit breaker 20 puts the shut-off unit 23 in its open state and shuts off the supply of power at the first circuit breaker 20, and transmits an emergency shut-off signal to the second circuit breakers 30 to put shut-off units 34 of the second circuit breakers 30 in their open state and shut-off the supply of power at the second circuit breakers 30.

The emergency shut-off control performed by the solar power generation network shut-off unit 1 of this embodiment will now be described using the timing chart shown in FIG. 5.

Figure 5:
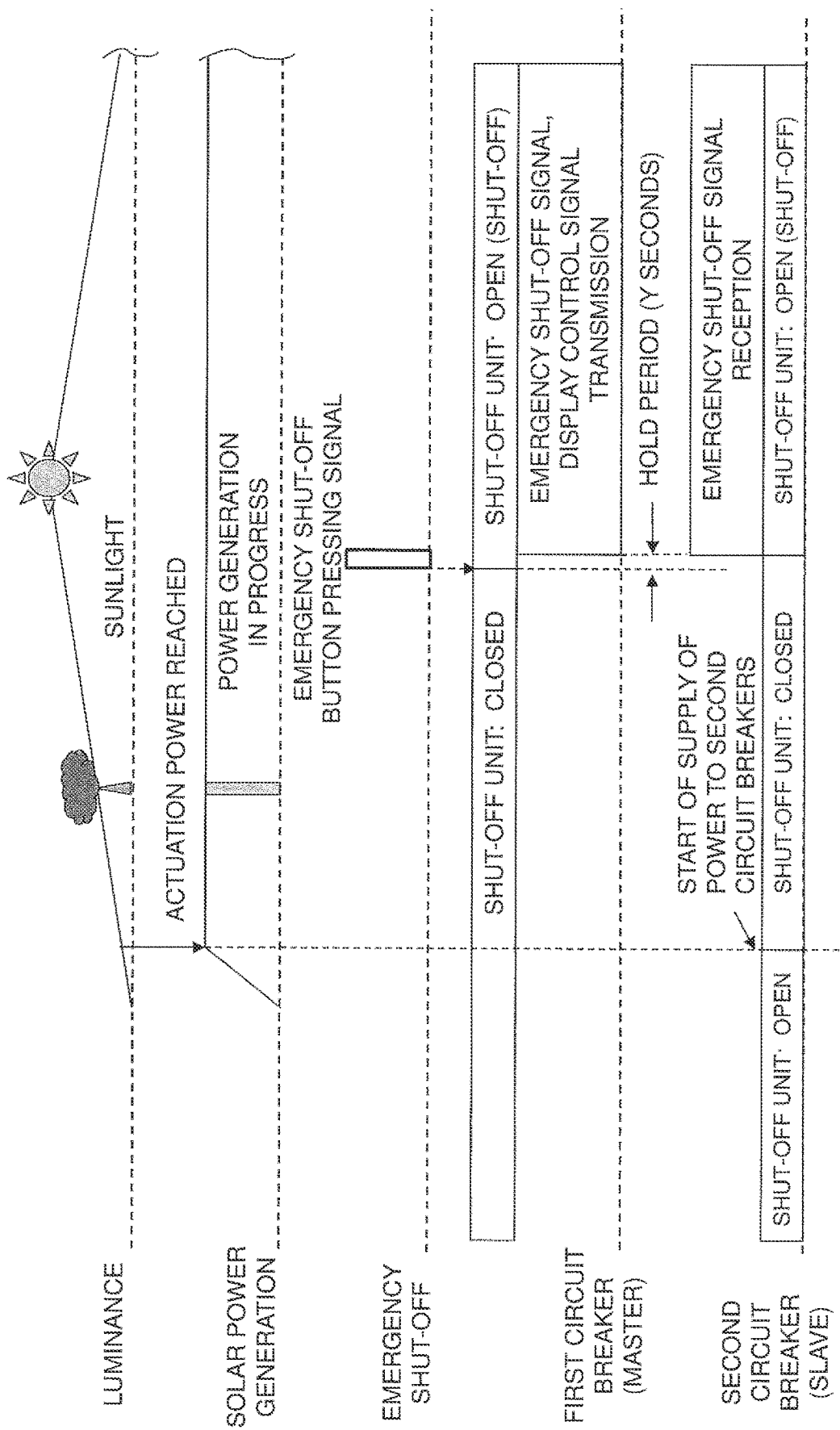
FIG. 5 is a timing chart showing the operation of the parts constituting the solar power generation network shut-off system of FIG. 1 when the emergency shut-off button is pressed.

FIG. 5 shows the power generation status in the solar power generation modules 11 according to the intensity (luminance) of sunlight, the pressing of the emergency shut-off button 13, the transmission and reception of signals at the first circuit breaker 20 and the second circuit breakers 30, and the states of the shut-off units 23 and 34 along with the elapsed time.

As shown in FIG. 5, in the plurality of solar power generation modules 11, once the amount of power generation reaches a specific actuation power due to increased luminance as the sun rises after sunrise, the supply of power is begun to the second circuit breakers 30, which are driven by the power supplied from the solar power generation modules 11. At this point, the actuated second circuit breakers 30 switch their shut-off units 34 from the open state to the closed state, and power is supplied from the solar power generation modules 11 to the power conditioner 12.

Since the first circuit breaker 20 receives power from the power supply unit 22 regardless of whether or not there is any solar power generation, the shut-off unit 23 remains closed.

Consequently, when the second circuit breakers 30 change to their closed state due to the supply of power from the solar power generation modules 11, the first circuit breaker 20 and the second circuit breakers 30 are both closed, so power can be supplied from the solar power generation modules 11 to the power conditioner 12.

Although the solar power generation module 11 can supply the power required to drive the second circuit breakers 30 during the time of day when the sunlight is strong and the luminance is high, if the weather becomes cloudy or rainy, for example, there is a risk that supply of the required power will be temporarily impossible, as shown in FIG. 5.

However, with the solar power generation network shut-off unit 1 of this embodiment, since the second circuit breakers 30 comprise the power supply holding circuit 33, even if the sky temporarily clouds over and the amount of power supplied from the solar power generation modules 11 decreases, power can still be supplied from the power supply holding circuits 33 to operate the second circuit breakers 30.

Next, when the emergency shut-off button 13 is pressed during repair or maintenance work, in an emergency, etc., as shown in FIG. 5, at the first circuit breaker 20, the emergency shut-off determination unit 21b determines whether or not an emergency shut-off button pressing signal has been received by the emergency shut-off button input unit 21a, indicating that the emergency shut-off button 13 has been pressed.

At this point, since the emergency shut-off button input unit 21a is receiving the emergency shut-off button pressing signal, the shut-off control unit 21c switches the shut-off unit 23 from its closed state to its open state, and puts the first circuit breaker 20 in a shut-off state.

After this, in the first circuit breaker 20, when a specific hold period (Y seconds) has elapsed since the shut-off unit 23 changed to the shut-off state, an emergency shut-off signal is transmitted to the second circuit breakers 30, and a display control signal is transmitted to the power conditioner 12.

At the second circuit breakers 30, when the signal receiving units 31a receive the emergency shut-off signal, the emergency shut-off determination units 31b determine that the emergency shut-off signal has been received, and the shut-off control units 31c control the shut-off units 34 so as to change from the closed state to the open state.

Consequently, following the transition of the shut-off unit 23 of the first circuit breaker 20 to the shut-off state, the shut-off units 34 of the second circuit breakers 30 can also be changed to the shut-off state.

As a result, the withstand voltage of the second circuit breakers 30 provided to each of a plurality of solar power generation modules 11 can be made lower than that of the first circuit breaker 20, so the cost can be greatly reduced as compared to a configuration in which one circuit breaker with a high withstand voltage is provided to each individual solar power generation module 11.

Also, compared to a configuration in which one circuit breaker is provided for each individual solar power generation module 11, in this configuration one second circuit breaker 30 is provided for four solar power generation modules 11, so the installation cost can be reduced.

Furthermore, at the power conditioner 12, when the signal receiving unit 44 receives the display control signal transmitted from the first circuit breaker 20, the display control unit 45 controls the display unit 46 so as to display the message "Emergency shut-off in progress" on the display screen 46a shown in FIG. 7b.

Therefore, in a state in which the shut-off units 23 and 34 have changed to the shut-off state in the first circuit breaker 20 and the second circuit breakers 30, a message indicating that emergency shut-off is in progress can be displayed on the display screen 46a of the display unit 46 of the power conditioner 12.

As a result, the user can look at the display screen 46a of the display unit 46 of the power conditioner 12 to confirm that emergency shut-off processing is completed in the first circuit breaker 20 and the second circuit breakers 30, and this ensures the safety of workers in the event of repairs, etc., and firefighters in the event of a fire, etc.

Shut-Off Control When Disconnection is Detected by Solar Power Generation Network Shut-Off Unit 1

With the solar power generation network shut-off unit 1 of this embodiment, in the above configuration, it is determined that a disconnection has occurred if a specific hold period (Y seconds) has elapsed since the last time the second circuit breakers 30 received an alive signal that is continuously transmitted from the first circuit breaker 20 to the second circuit breakers 30 at specific time intervals, in which case the shut-off units 34 of the second circuit breakers 30 are put in their open state and the supply of power at the second circuit breakers 30 is shut-off.

The disconnection detection and shut-off control performed by the solar power generation network shut-off unit 1 of this embodiment will now be described using the timing chart shown in FIG. 6.

Figure 6:
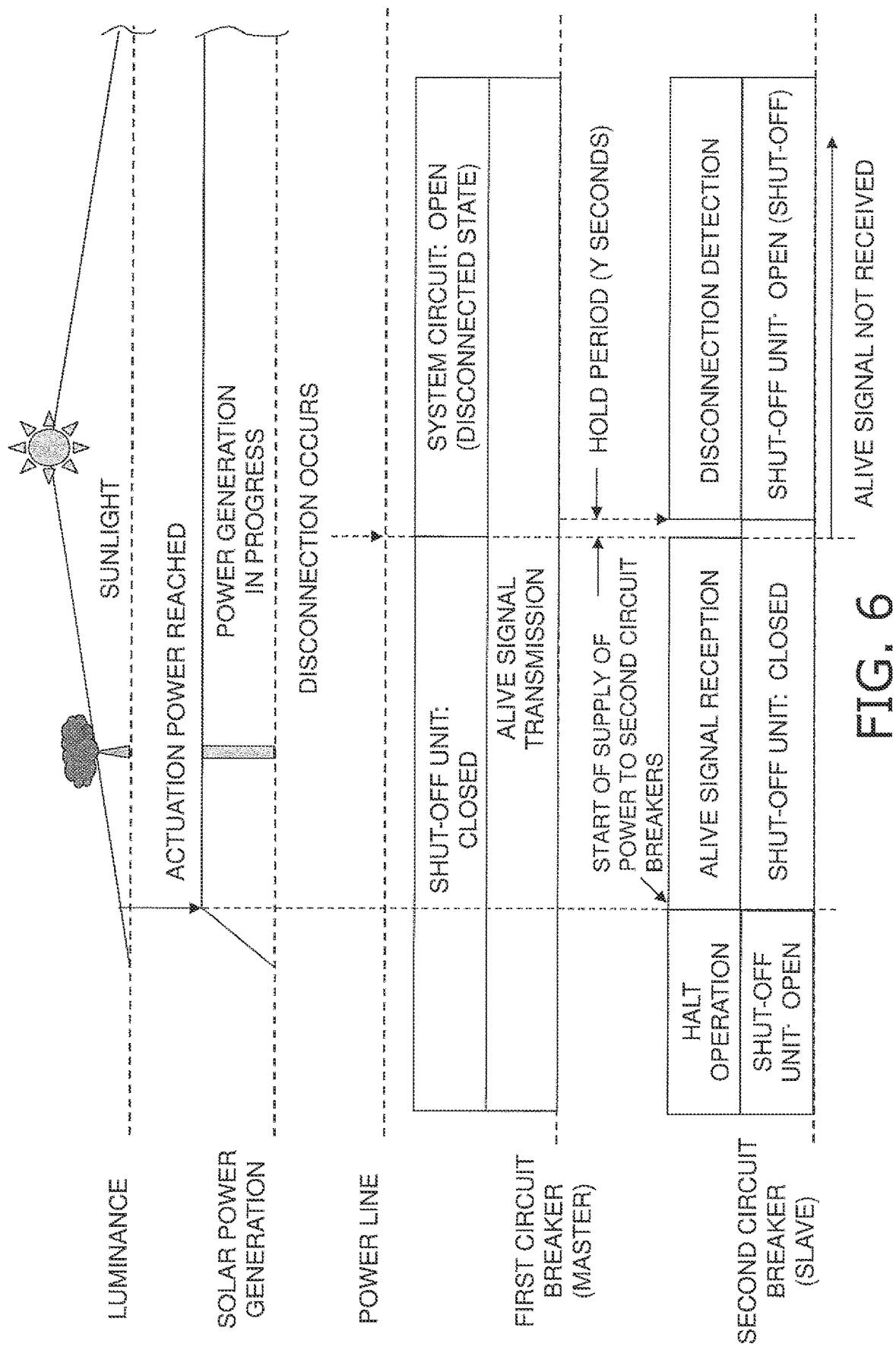
FIG. 6 is a timing chart showing the operation of the parts constituting the solar power generation network shut-off system of FIG. 1 when a disconnection has occurred.
Figure 7:
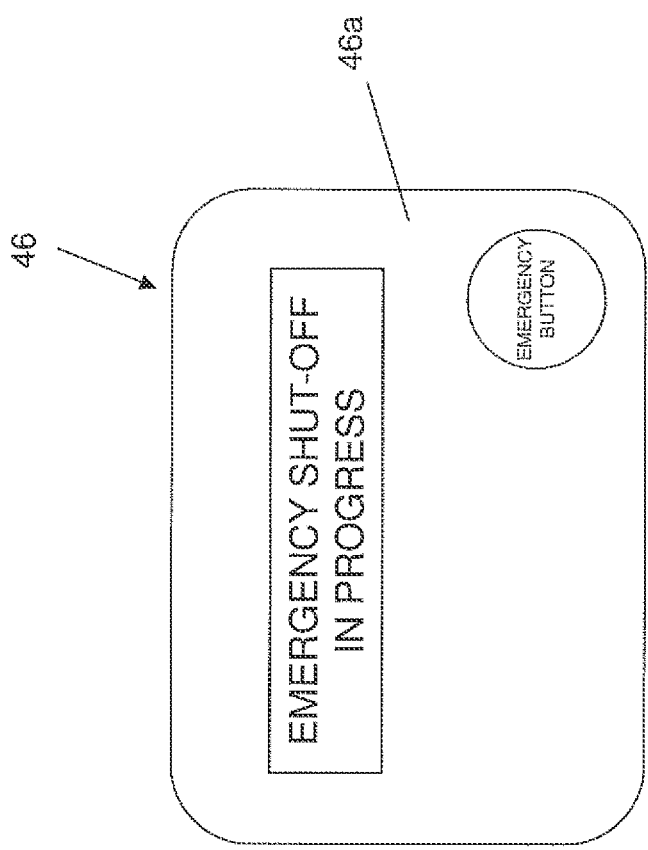
FIG. 7 is a diagram showing the display screen of the display unit of the power conditioner when the emergency circuit breaker button is pressed and the first circuit breaker changes to the shut-off state.

FIG. 6 shows the power generation status in the solar power generation modules 11 according to the intensity (luminance) of sunlight, whether or not a disconnection has occurred in the power line 14, the transmission and reception of signals at the first circuit breaker 20 and the second circuit breakers 30, and the state of the shut-off units 23 and 34 along with the elapsed time.

Since the relation between the power generation status of the solar power generation modules 11 and the supply of power to the second circuit breakers 30 is the same as that in FIG. 5 described above, it will not be described again here.

When in an actuated state, the first circuit breaker 20 continuously transmits an alive signal to the second circuit breakers 30 at specific time intervals.

Then, when the second circuit breakers 30 are actuated by the supply of power from the solar power generation modules 11, the signal receiving units 31a receive the alive signal continuously transmitted from the first circuit breaker 20.

Here, if a disconnection occurs in a part of the power line 14, as shown in FIG. 6, the alive signal continuously transmitted from the first circuit breaker 20 cannot be received by the second circuit breakers 30. More specifically, if the power line 14 is normal, the signal receiving units 31a of the second circuit breakers 30 cannot receive the alive signal that is supposed to be received at specific time intervals.

At this point, in the first circuit breaker 20, the shut-off unit 23 has not changed to its open state, but since the solar power generation modules 11 and the power conditioner 12 are connected in series, the system circuit is in an open state. Consequently, when viewed from the second circuit breakers 30, this state is almost the same as the state in which the shut-off unit 23 is open in the first circuit breaker 20.

On the other hand, with the second circuit breakers 30, if a specific hold period (Y seconds) has elapsed since the alive signal determination unit 31d determined that no alive signal has been received, the disconnection determination unit 31e determines that a disconnection has occurred in a part of the power line 14.

Consequently, the shut-off control unit 31c can control the shut-off units 34 so that the shut-off units 34 change from their closed state to their open state. Then, following the detection of the disconnection that occurred in a part of the power line 14, the shut-off units 34 can also be changed to the shut-off state in the second circuit breakers 30.

That is, the second circuit breakers 30 can be put in a shut-off state after it is detected that the system circuit including the solar power generation modules 11 and the power conditioner 12 is in an open state due to a disconnection of the power line 14.

As a result, the withstand voltage of the second circuit breakers 30, which are provided one for a plurality of solar power generation modules 11, can be made lower than that of the first circuit breaker 20, so the cost can be greatly reduced as compared with a configuration in which one circuit breaker with high withstand voltage is provided for each individual solar power generation module 11.

Furthermore, compared to a configuration in which one circuit breaker is provided for each individual solar power generation module 11, in this configuration the second circuit breakers 30 are provided one for four solar power generation modules 11, so the installation cost can be reduced.

Shut-Off Flow in Solar Power Generation Network Shut-Off Unit 1

The shut-off flow carried out in the solar power generation network shut-off unit 1 of this embodiment will now be described through reference to the flowcharts shown in FIGS. 8 and 9.

Figure 8:
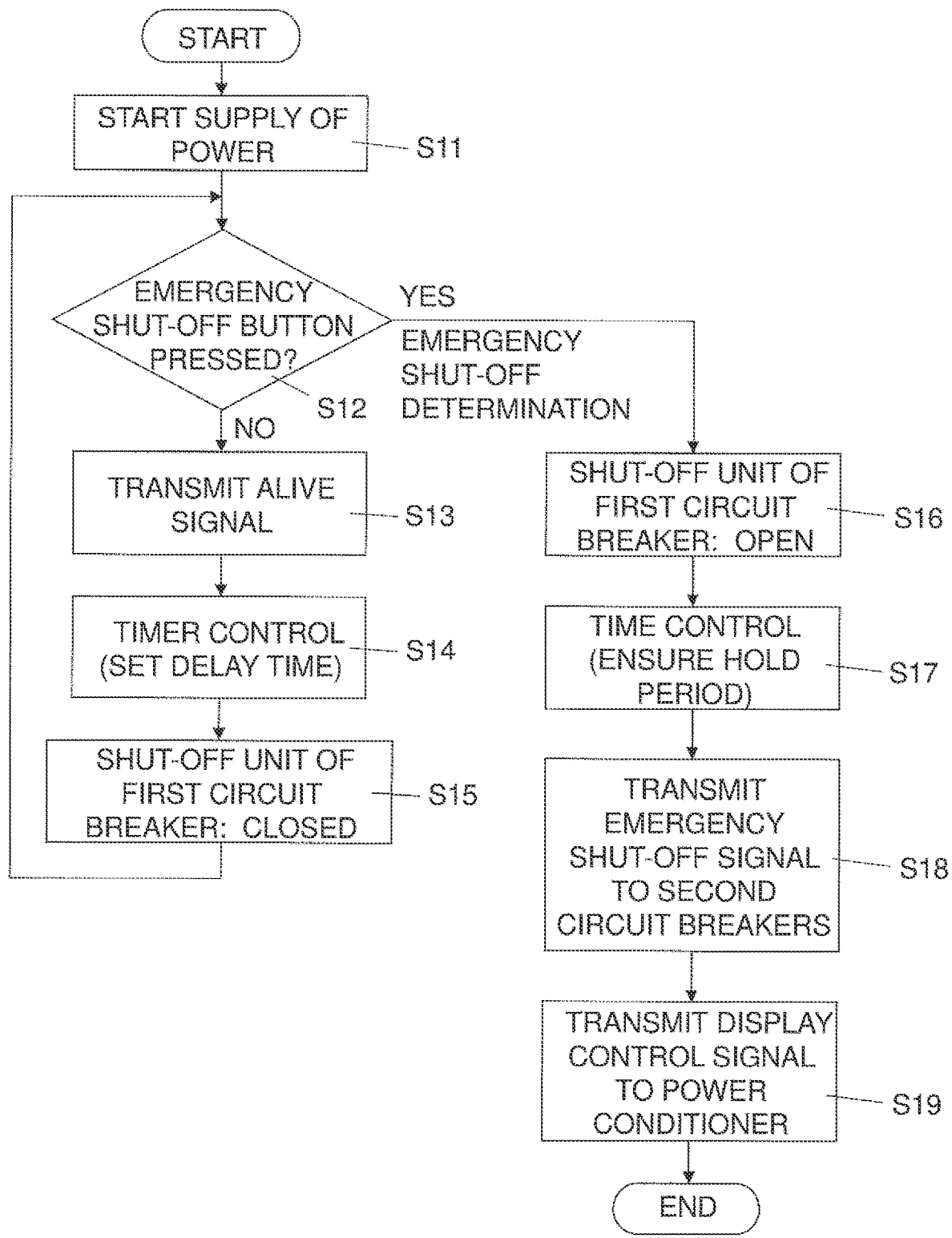
FIG. 8 is a flowchart showing the control flow in the first circuit breaker constituting the solar power generation network shut-off unit included in the solar power generation network shut-off system of FIG. 1.
Figure 9:
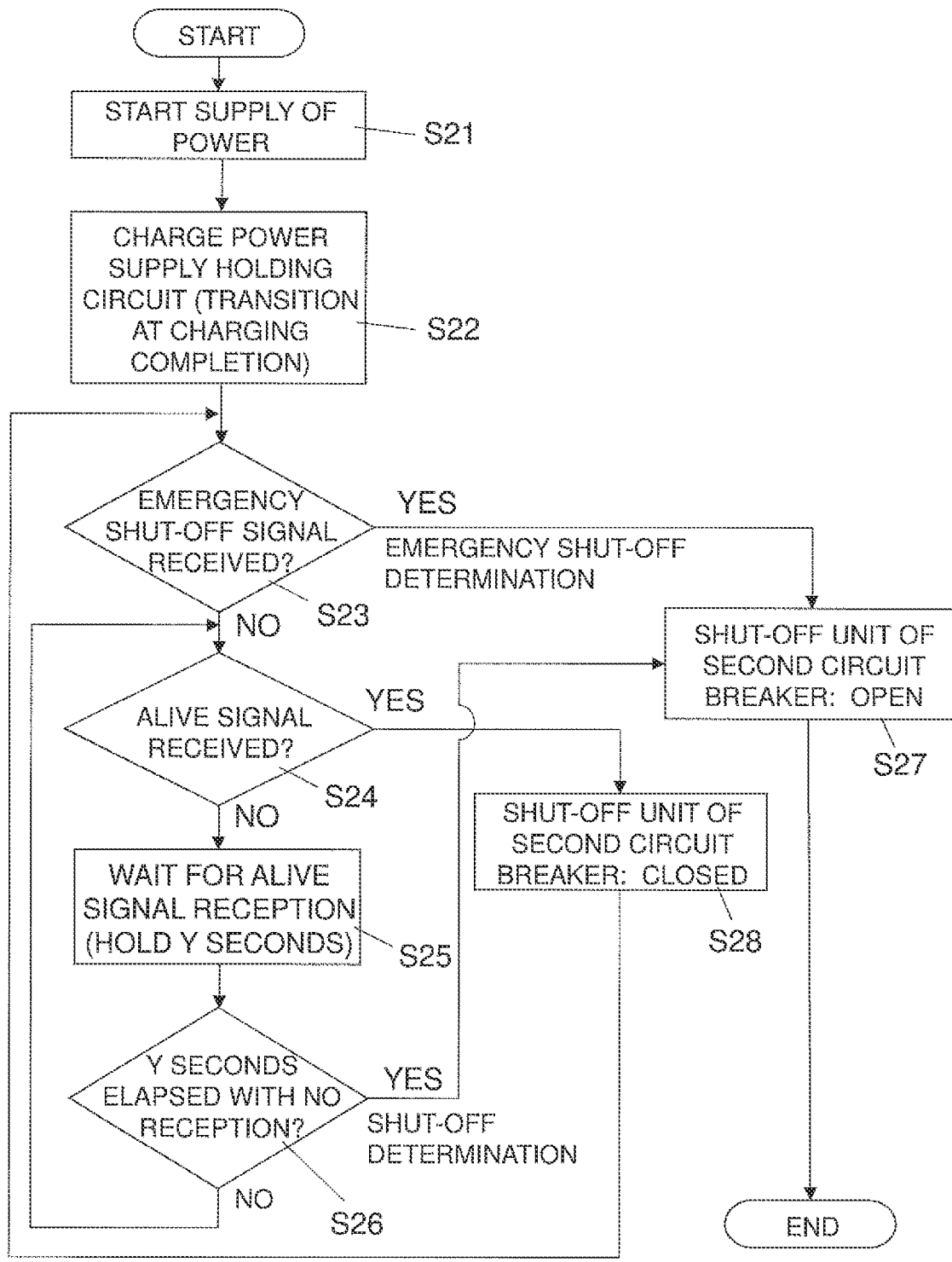
FIG. 9 is a flowchart showing the control flow in the second circuit breaker constituting the solar power generation network shut-off unit included in the solar power generation network shut-off system of FIG. 1.

FIG. 8 shows the processing in the first circuit breaker 20, and FIG. 9 shows the processing in the second circuit breakers 30.

Processing in First Circuit Breaker 20

As shown in FIG. 8, in the processing on the first circuit breaker 20 side, first, when the supply of power to the first circuit breaker 20 is started in step S11, whether or not the emergency shut-off button 13 has been pressed is monitored in step S12.

If the button has not been pressed, the processing proceeds to step S13, and if the button has been pressed, the processing proceeds to step S16.

Next, in step S13, since it was determined in step S12 that the emergency shut-off button 13 was not pressed, the communication control unit 21e controls the signal output unit 24 to transmit an alive signal to the second circuit breakers 30.

Next, in step S14, the communication control unit 21e controls the signal output unit 24 so that an alive signal will be continuously transmitted at specific time intervals on the basis of the delay time set in the holding circuit unit 21d.

Next, in step S15, the processing returns to monitoring the pressing of the emergency shut-off button 13 in step S12, while the shut-off unit 23 of the first circuit breaker 20 in left in its closed state.

On the other hand, in step S16, since it was determined in step S12 that the emergency shut-off button 13 was pressed, the shut-off unit 23 is immediately switched from its closed state to its open state, and the first circuit breaker 20 goes into a shut-off state.

More precisely, when the emergency shut-off determination unit 21b determines that an emergency shut-off button pressing signal has been inputted to the emergency shut-off button input unit 21a, the shut-off control unit 21c immediately changes the shut-off unit 23 to a shut-off state.

Next, in step S17, if the specific hold period (Y seconds) set in the holding circuit unit 21d has elapsed since the communication control unit 21e put the shut-off unit 23 of the first circuit breaker 20 in an open state (shut-off state), the signal output unit 24 is controlled so as to transmit an emergency shut-off signal to all of the second circuit breakers 30.

Next, in step S18, an emergency shut-off signal is transmitted from the signal output unit 24 to all of the second circuit breakers 30.

Next, in step S19, the display signal control unit 21f controls the display signal output unit 25 so as to transmit to the power conditioner 12 a display control signal for displaying the message "emergency shut-off in progress" on the display unit 46 of the power conditioner 12.

Consequently, in the power conditioner 12, the message "emergency shut-off in progress" can be displayed on the display screen 46a of the display unit 46.

The above steps S11 to S19 conclude the processing in the first circuit breaker 20.

Processing in Second Circuit Breakers 30

As shown in FIG. 9, in the processing on the second circuit breakers 30 side, first, when the supply of power from the solar power generation modules 11 is begun in step S21, the power supply holding circuit 33 is charged in step S22. Then, when the charging of the power supply holding circuit 33 is complete, the processing proceeds to step S23.

Next, in step S23, it is determined whether or not an emergency shut-off signal has been received from the first circuit breaker 20.

If this signal has not been received, the processing proceeds to step S24, but if the signal has been received, the processing proceeds to step S27 in order to proceed with the emergency shut-off processing.

Next, in step S24, since it was determined in step S23 that the emergency shut-off signal had not been received, it is determined whether or not an alive signal has been received from the first circuit breaker 20 in order to confirm whether a disconnection has occurred in a part of the power line 14.

If this signal has not been received, it is determined that a disconnection may have occurred, and the processing proceeds to step S25. If the signal has been received, the processing proceeds to step S28.

Next, in step S25, since it was determined in step S24 that the alive signal had not been received, the system awaits the reception of the alive signal until a specific hold period (Y seconds) has elapsed since the last receipt of an alive signal.

Next, in step S26, it is determined whether or not Y seconds have elapsed without an alive signal being received, and if this signal has been received, the processing returns to step S24, but if it has still not been received, it is determined that it is probable that a disconnection has occurred, and the processing proceeds to step S27.

Next, in step S27, if it is determined in step S23 that an emergency shut-off signal has been received, or if it is determined in step S26 that a disconnection has occurred, the shut-off units 34 of the second circuit breakers 30 are switched from their closed state to their open state, the second circuit breakers 30 are put in to the shut-off state, and the processing in the second circuit breakers 30 is ended.

On the other hand, since it was determined in step S23 that no emergency shut-off signal had been received, and in step S24 that the alive signal was received, in step S28 it is determined that there is no need for emergency shut-off processing or disconnection detection shut-off processing, the shut-off units 34 of the second circuit breakers 30 are left in their closed state, and the processing from step S23 onward is repeated.

Main Features

As described above, the solar power generation network shut-off unit 1 of this embodiment is a device that is disposed between the plurality of solar power generation modules 11 and the power conditioner 12, and that shuts off the supply of power from the solar power generation modules 11 to the power conditioner 12 when the emergency shut-off button 13 is pressed, the device comprising the first circuit breaker 20 and the second circuit breakers 30. The first circuit breaker 20 is provided on the power line 14 that connects the solar power generation modules 11 and the power conditioner 12 in series, and when the emergency shut-off button 13 is pressed, shuts off the supply of power from the solar power generation modules 11 through the power line 14, and transmits an emergency shut-off signal. The second circuit breakers 30 are each provided one for a plurality of solar power generation modules 11, and when an emergency shut-off signal is received from the first circuit breaker 20, shut-off the supply of power from the solar power generation modules 11 through the power line 14.

Consequently, when the emergency shut-off button 13 is pressed in an emergency such as a fire, or during repair, maintenance, etc., for example, first, the first circuit breaker 20 shuts off the supply of power from the solar power generation modules 11 to the power conditioner 12 and transmits an emergency shut-off signal, and the transmitted emergency shut-off signal is received by the second circuit breakers 30, so that the supply of power from the solar power generation modules 11 to the power conditioner 12 can be shut off on the second circuit breaker 30 side.

As a result, when the emergency shut-off button 13 is pressed, the high-voltage power supplied from the solar power generation modules 11 is prevented from being applied, which ensures the safety of workers and the like. Also, by using a combination of the second circuit breakers 30, which are provided one for a plurality of the solar power generation modules 11, and the first circuit breaker 20, which controls shut-off in the second circuit breakers 30, the installation cost can be reduced compared to a conventional configuration in which one circuit breaker is provided for each individual solar power generation module 11.

Furthermore, because the first circuit breaker 20, which is provided just upstream from the power conditioner 12, is put in a shut-off state before the second circuit breakers 30, which are provided one for a plurality of the solar power generation modules 11, the voltage applied to the contact portion when the second circuit breakers 30 are switched from their closed state to their open state can be kept lower than that of the first circuit breaker 20.

As a result, since the withstand voltage of the second circuit breakers 30 provided one for a plurality of the solar power generation modules 11 can be set low, the cost can be greatly reduced as compared with a configuration in which one circuit breaker with a high withstand voltage is provided for each individual solar power generation module.

As described above, the solar power generation network shut-off unit 1 of this embodiment is a device that is disposed between the plurality of solar power generation modules 11 and the power conditioner 12, and that shuts off the supply of power from the solar power generation modules 11 to the power conditioner 12, the device comprising a first circuit breaker 20 and second circuit breakers 30. The first circuit breaker 20 is provided on a power line 14 that connects the solar power generation modules 11 and the power conditioner 12 in series, and shuts off the supply of power from the solar power generation modules 11 through the power line 14, and also continuously transmits an alive signal. The second circuit breakers 30 are provided one for a plurality of solar power generation modules 11, receive the alive signal continuously transmitted from the first circuit breaker 20, and shut off the supply of power from the solar power generation modules 11 through the power line 14 when a specific length of time has elapsed since the interruption of the reception of the alive signal.

Consequently, when a disconnection occurs in a part of the power line 14 constituting the solar power generation network shut-off system 10 in the event of a fire or the like, for example, if a specific length of time has elapsed since an interruption in the reception of the alive signal continuously transmitted from the first circuit breaker 20 was detected in the second circuit breakers 30, the supply of power from the solar power generation modules 11 to the power conditioner 12 can be shut off in the second circuit breakers 30.

As a result, it is possible to prevent the application of the high-voltage power supplied from the solar power generation modules 11 in the event of a fire or the like, which ensures the safety of firefighters and so on. Also, by using a combination of the second circuit breakers 30, which are provided one for a plurality of the solar power generation modules 11, and the first circuit breaker 20, which controls shut-off in the second circuit breakers 30, the installation cost can be reduced compared to a conventional configuration in which one circuit breaker is provided for each individual solar power generation module 11.

Furthermore, because the the second circuit breakers 30 are shut off after it has been detected that a disconnection has occurred in a part of the power line 14 constituting the solar power generation network shut-off system 10, and the entire system is in an open state, the voltage applied to the contact portion can be kept low in switching the second circuit breakers 30 from their closed state to their open state.

As a result, the withstand voltage of the second circuit breakers 30 provided one for a plurality of the solar power generation modules 11 can be set low, so the cost can be greatly reduced as compared to a configuration in which one circuit breaker with high withstand voltage is provided for each individual solar power generation module.

Other Embodiments

An embodiment of the present invention was described above, but the present invention is not limited to or by the above embodiment, and various modifications are possible without departing from the gist of the invention.

(A)

In the above embodiment, an example was given in which emergency shut-off control, in which the shut-off unit 23 and the shut-off units 34 were shut-off in that order in the first circuit breaker 20 and the second circuit breakers 30 by an emergency shut-off operation signal transmitted when the emergency shut-off button 13 was pressed, was combined with disconnection detection shut-off control, in which a state of not having received an alive signal was detected to detect disconnection of the power line 14, and the shut-off units 34 were shut-off in the second circuit breakers 30, but the present invention is not limited to this.

For instance, the solar power generation network shut-off unit may carry out either emergency shut-off control or disconnection detection shut-off control.

(B)

In the above embodiment, an example was given in which the first circuit breaker 20 functioning as a master unit was disposed at a position adjacent to the upstream side of the power conditioner 12 in the supply direction of the power supplied from the solar power generation modules 11, but the present invention is not limited to this.

For instance, the system may be configured such that the first circuit breaker functioning as the master unit is installed in a state of being integrated with the power conditioner.

Alternatively, the first circuit breaker may be disposed anywhere within the system so long as it is on the upstream side of the inverter included in the power conditioner of the solar power generation network shut-off system.

(C)

In the above embodiment, an example was given in which the emergency shut-off button 13, which was pressed during repair or maintenance or in the event of an emergency such as a fire, and which shut-off the supply of power from the solar power generation modules 11, was connected to the power conditioner 12, but the present invention is not limited to this.

For instance, the emergency shut-off button may be provided anywhere within the solar power generation network shut-off system.

(D)

In the above embodiment, an example was given in which the second circuit breakers 30 were actuated by being supplied with power generated by the solar power generation modules 11, but the present invention is not limited to this.

For instance, the configuration may be such that a power supply device is provided inside the second circuit breakers, or the configuration may be such that drive is by the power supplied from the first circuit breaker or the power conditioner side.

(E)

In the above embodiment, an example was given in which the second circuit breakers 30 comprised the power supply holding circuit 33 that temporarily stored the power supplied from the solar power generation modules 11, but the present invention is not limited to this.

For instance, if the configuration is such that a power supply device is provided inside the second circuit breakers as mentioned above, or the configuration is such that drive is by the power supplied from the first circuit breaker or the power conditioner side, the second circuit breaker does not have to have a power supply holding circuit.

(F)

In the above embodiment, an example was given of a system configuration in which one second circuit breaker 30 was installed for four solar power generation modules 11, but the present invention is not limited to this.

For instance, the system configuration may be such that one second circuit breaker is provided for two or three solar power generation modules, or the system configuration may be such that one second circuit breaker is provided for five or more solar power generation modules.

(G)

In the above embodiment, an example was given in which emergency shut-off signals and alive signals were transmitted and received between the first circuit breaker 20 and the second circuit breakers 30 via the power line 14, but the present invention is not limited to this.

For instance, the transmission and reception of emergency shut-off signals and alive signals between the first circuit breaker and the second circuit breakers are not limited to wired communication, and may be accomplished, for example, by wireless communication such as Wifi (registered trademark).

INDUSTRIAL APPLICABILITY

The solar power generation network shut-off unit of the present invention has the effect of reducing the installation cost when installing circuit breakers that operate in an emergency or the like, and is therefore widely applicable to solar power generation systems that include circuit breakers.

REFERENCE SIGNS LIST

1 solar power generation network shut-off unit
10 solar power generation network shut-off system
11 solar power generation module
12 power conditioner
12*a* relay
12*b* inverter
12*c* relay
13 emergency shut-off button
14 power line
14*a* connector
15 commercial power system
20 first circuit breaker
20*a* AC power supply
21 control unit
21*a* emergency shut-off button input unit
21*b* emergency shut-off determination unit (first emergency shut-off determination unit)
21*c* shut-off control unit (first shut-off control unit)
21*d* holding circuit unit
21*e* communication control unit (first communication control unit)
21*f* display signal control unit
22 power supply unit
23 shut-off unit (first shut-off unit)
24 signal output unit (first communication unit)
25 display signal output unit
30 second circuit breaker
31 control unit
31*a* signal receiving unit (second communication unit)
31*b* emergency shut-off determination unit (second emergency shut-off determination unit)
31*c* shut-off control unit (second shut-off control unit)
31*d* alive signal determination unit (signal determination unit)
31*e* disconnection determination unit
32 power supply unit
33 power supply holding circuit (power supply holding unit)
34 shut-off unit (second shut-off unit)
41 DC power input unit
42 DC/AC conversion unit
43 AC power output unit
44 signal receiving unit
45 display control unit
46 display unit
46*a* display screen

The invention claimed is:

1. A solar power generation network shut-off unit that is disposed between a plurality of solar power generation modules and a power conditioner and that shuts-off a supply of power from the solar power generation modules to the power conditioner when an emergency shut-off button is pressed, the solar power generation network shut-off unit comprising:
 a first circuit breaker that is provided to a power line connecting the plurality of solar power generation modules and the power conditioner in series, the first circuit breaker configured to shut-off the supply of power through the power line from the solar power generation modules when the emergency shut-off button is pressed and transmit an emergency shut-off signal when a specific hold period has elapsed since the first circuit breaker changed to the shut-off state; and
 second circuit breakers that are provided to each of a plurality of solar power generation modules, the second circuit breakers configured to shut-off the supply of power from the plurality of solar power generation modules through the power line when the emergency shut-off signal is received from the first circuit breaker.

2. The solar power generation network shut-off unit according to claim 1, wherein the first circuit breaker has a first emergency shut-off determination unit configured to detect that the emergency shut-off button has been pressed; a first shut-off unit configured to shut off a supply of power from the solar power generation modules through the power line; and a first shut-off control unit configured to control the first shut-off unit so as to shut off the supply of power when the first emergency shut-off determination unit determines that the emergency shut-off button has been pressed.

3. The solar power generation network shut-off unit according to claim 2,
wherein the first circuit breaker further has a display signal output unit configured to transmit to the power conditioner a display signal for controlling a display unit provided to the power conditioner so as to display that emergency shut-off is in progress when the first emergency shut-off determination unit determines that the emergency shut-off button has been pressed.

4. The solar power generation network shut-off unit according to claim 2,
wherein the first circuit breaker further has a first communication unit configured to transmit a communication signal to the second circuit breakers; and a first communication control unit configured to control the first communication unit so as to continuously transmit the communication signal.

5. The solar power generation network shut-off unit according to claim 4,
wherein the second circuit breakers have a second communication unit configured to receive the communication signal continuously transmitted from the first communication unit; a signal determination unit configured to detect that the reception of the communication signal received by the second communication unit has been interrupted; and a disconnection determination unit configured to detect that a reception of the communication signal at the signal determination unit has been interrupted, and determine that there is a disconnection in the power line if a specific length of time has elapsed.

6. The solar power generation network shut-off unit according to claim 1,
wherein the second circuit breakers have a second communication unit configured to receive the emergency shut-off signal; a second emergency shut-off determination unit configured to determine whether or not the emergency shut-off signal has been received by the second communication unit; a second shut-off unit configured to shut off a supply of power from the solar power generation modules through the power line; and a second shut-off control unit configured to control the second shut-off unit so as to shut off the supply of power when the second emergency shut-off determination unit determines that the emergency shut-off signal has been received.

7. The solar power generation network shut-off unit according to claim 6,
wherein the second circuit breakers further have a power holding unit configured to store a power supplied from the solar power generation modules.

8. The solar power generation network shut-off unit according to claim 1,
wherein the second circuit breakers are such that the second shut-off control unit controls the second shut-off unit so as to shut off the supply of power after confirming a shut-off state in the first circuit breaker.

9. The solar power generation network shut-off unit according to claim 1,
wherein the first circuit breaker and the second circuit breakers transmit and receive the emergency shut-off signals via wired communication.

10. A solar power generation network shut-off system, comprising:
the solar power generation network shut-off unit according to claim 1;
the plurality of solar power generation modules;
the power conditioner;
the power line; and
the emergency shut-off button.

11. A solar power generation network shut-off unit that is disposed between a plurality of solar power generation modules and a power conditioner and that shuts-off a supply of power from the solar power generation modules to the power conditioner, the solar power generation network shut-off unit comprising:
a first circuit breaker that is provided to a power line connecting the plurality of solar power generation modules and the power conditioner in series, the first circuit breaker configured to shut-off the supply of power from the solar power generation modules through the power line, and continuously transmit a communication signal; and
second circuit breakers that are provided to each of a plurality of solar power generation modules, the second circuit breakers configured to receive the communication signal continuously transmitted from the first circuit breaker, and, when a specific length of time has elapsed since an interruption of a reception of the communication signal, the second circuit breakers configured to shut-off a supply of power from the plurality of solar power generation modules through the power line, and
wherein the first circuit breaker has a first communication unit configured to transmit the communication signal; and a first communication control unit configured to control the first communication unit so as to continuously transmit the communication signal,
wherein the second circuit breakers have a second communication unit that receives the communication signal continuously transmitted from the first communication unit; a signal determination unit that detects that the reception of the communication signal received by the second communication unit has been interrupted; a disconnection determination unit that determines that there is a disconnection in the power line if a specific length of time has elapsed since the signal determination unit detected that the reception of the communication signal has been interrupted; a second shut-off unit that shuts off the supply of power from the solar power generation modules through the power line; a second shut-off control unit that controls the second shut-off unit so as to shut-off the supply of power when the disconnection determination unit has determined that there is a disconnection.

12. The solar power generation network shut-off unit according to claim 11,
wherein the second circuit shut-off control unit controls the second shut-off unit such that the second shut-off unit shuts off a supply of power after the disconnection determination unit has determined that there is a disconnection in the power line and the system including the solar power generation modules is opened.

13. The solar power generation network shut-off unit according to claim 11,
   wherein the second circuit breakers further have a power supply holding unit configured to store an electric power supplied from the solar power generation modules.

14. The solar power generation network shut-off unit according to claim 11,
   wherein the first circuit breaker and the second circuit breakers transmit and receive communication signals through wired communication.

\* \* \* \* \*